Sept. 20, 1938.　　　A. K. FISCHER ET AL　　　2,130,981
ROTAMETER
Filed Dec. 11, 1937　　　3 Sheets-Sheet 1

WITNESS:

INVENTORS
Adelbert K. Fischer
Gustav B. Petsche
BY
Augustus B. Stoughton
ATTORNEY.

Sept. 20, 1938.  A. K. FISCHER ET AL  2,130,981
ROTAMETER
Filed Dec. 11, 1937   3 Sheets-Sheet 2
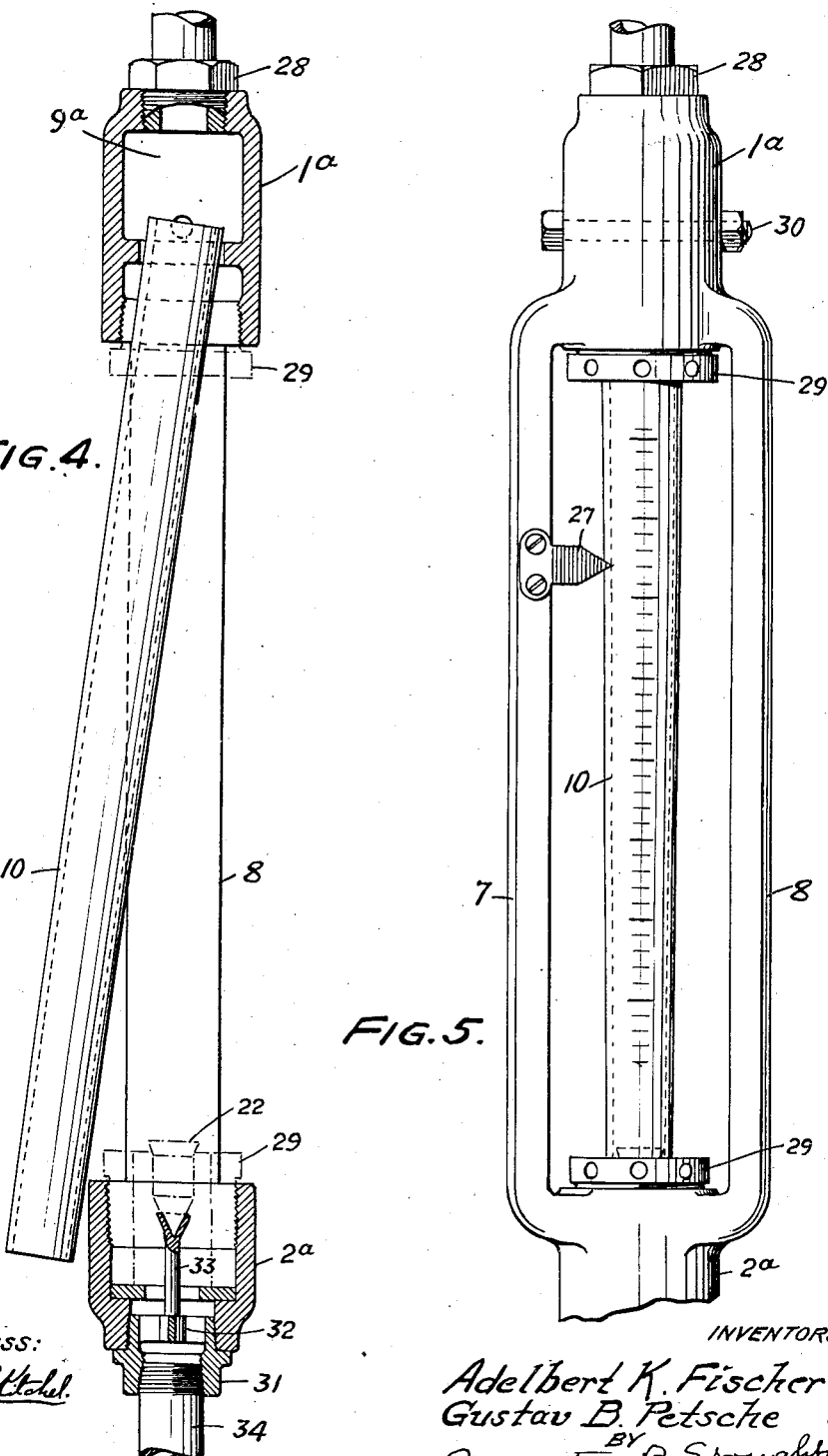

Sept. 20, 1938.  A. K. FISCHER ET AL  2,130,981
ROTAMETER
Filed Dec. 11, 1937    3 Sheets—Sheet 3
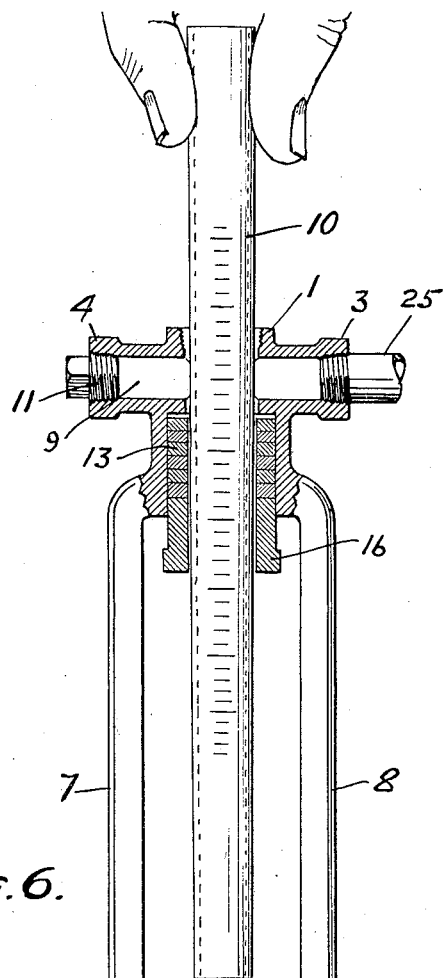
FIG.6.
WITNESS:
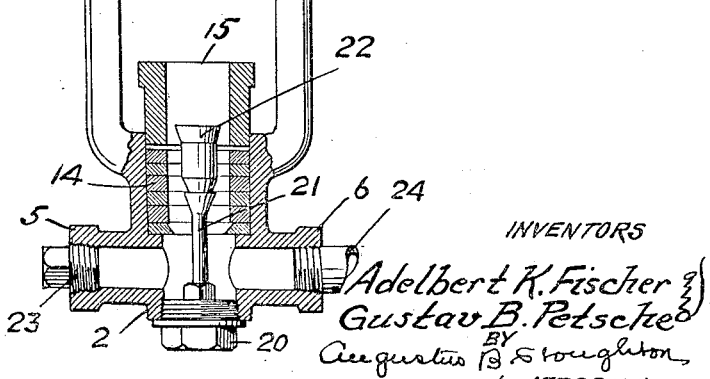
INVENTORS
Adelbert K. Fischer
Gustav B. Petsche
BY Augustus B. Stoughton
ATTORNEY.

Patented Sept. 20, 1938

2,130,981

UNITED STATES PATENT OFFICE 2,130,981

ROTAMETER

Adelbert K. Fischer and Gustav B. Petsche, Philadelphia, Pa., assignors to Schutte & Koerting Co., Philadelphia, Pa., a corporation of Pennsylvania Application December 11, 1937, Serial No. 179,272

2 Claims. (Cl. 73—209)

The principal objects of the present invention are to provide for interchanging the tubes without disturbing the piping, to provide for removing and replacing the rotor without disturbing the tube and its packings, to provide for cleaning the inside of the tube without disturbing the piping or removing any part of the instrument except one pipe plug, thereby saving time, to facilitate the arrangement of piping and connections therefor; to reduce the number of parts or more accurately separate parts involved in the construction and generally to improve and make more convenient the installation and operation of rotameters.

Other objects of the invention will appear from the following description at the end of which the invention will be claimed.

Generally stated the invention comprises a unitary structure, including heads provided with fittings for the pipe connection and columns connecting the heads, one of said heads having means consisting of the provision of space and adapted to accommodate endwise movement of the tube so that the tube can be mounted and dismounted when the packing glands are backed off and without disconnecting the pipe connection.

The invention also comprises the improvements to be presently described and finally claimed.

In the following description reference will be made to the accompanying drawings forming part hereof and in which, Figure 1 is a vertical sectional view of a rotameter embodying features of the invention.

Fig. 4 is a view similar to Fig. 1, embodying a modification of the invention and showing the removal of the tube.

Fig. 5 is a front elevational view of the modification shown in Fig. 4, and

Figure 6 is a view drawn to a reduced scale and illustrating the removal of the tube at the upper end of the rotameter.

Figure 1:
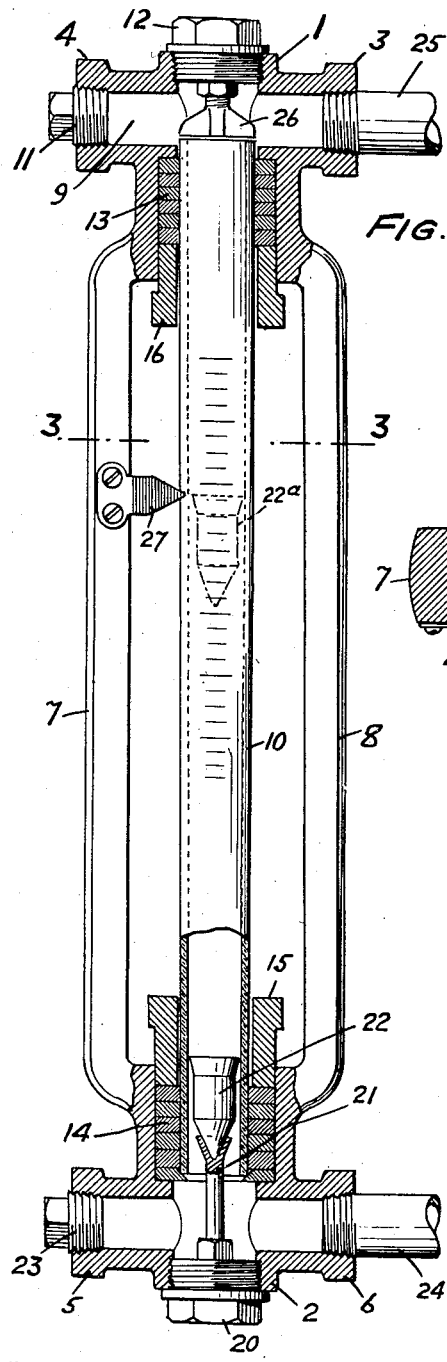
Figure 3:
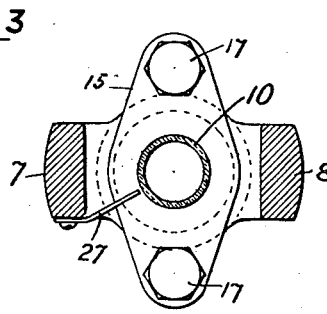
Fig. 3 is a sectional view taken on the line 3—3 of Fig. 1.
Figure 2:
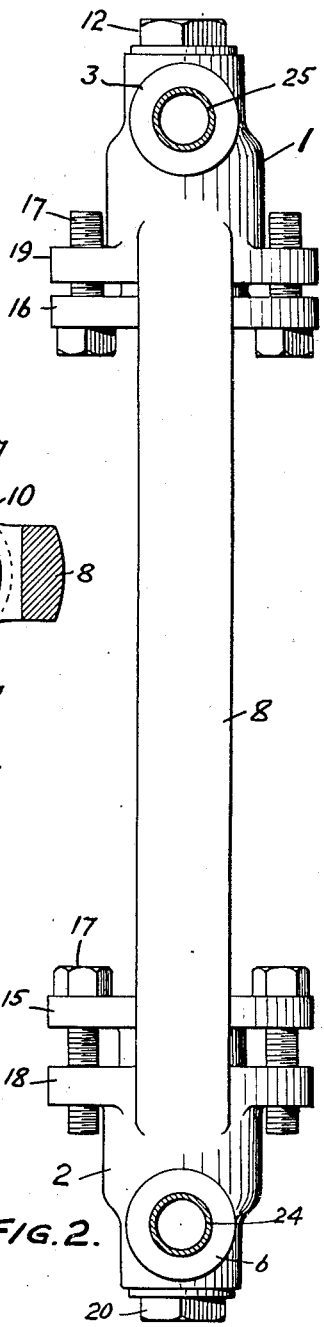
Fig. 2 is a side elevational view of the same.

Referring to the drawings and more particularly to Figs. 1 to 3, there is shown a unitary structure including heads 1 and 2 provided respectively with fittings 3 and 4 and 5 and 6 for pipe connections. The unitary structure also includes columns 7 and 8. The heads, the pipe fittings and the columns are cast in one piece. Obviously this construction presents many advantages which will be understood from the following description: the head 1 is provided with space indicated at 9 and this space accommodates endwise movement of the tapering glass tube 10 in such a way that the tube can be mounted and dismounted. The space 9 is shown as enclosed by two screw plugs 11 and 12. 13 and 14 indicate packings for the respective ends of the tube 10, and 15 and 16 indicate glands for the packing. The glands 15 and 16 are connected by bolts 17 with ears 18 and 19 integral with the heads. 20 indicates a screw plug arranged in an opening in the head 2 and it carries a support 21 for the float 22. The head 2 is provided with a screw plug 23 which is employed like the screw plug 11 of the head 1 to blank off or close the fitting with which the pipe is not connected. The pipe connections are shown at 24 and 25. It will of course be understood that the pipe connections may be made at either side of the heads and they may be led off horizontally or by the use of unions led in substantially any desired direction. The screw plug 12 is provided with a spider 26 which overlies the larger end of the tapering tube 10 and serves to keep it in position as well as to operate as a guard if need be to stop the float.

One advantage of the described construction is that an index 27 may be conveniently applied to and supported by one of the columns in any desired position for the purpose of indicating the level to which the float should be permitted to rise in order to perform the required operation in connection with which the rotameter is employed. At 22ª there is shown in dotted lines the position that may be occupied by the float when the index 27 is used in cooperation with it. In use the tube 10 can be mounted and dismounted without disturbing the pipe connections in the following manner: The glands 15 and 16 are backed off thus releasing the packing. The plug 12 and the spider 26 are removed thus making the space 9 available so that the tube can be passed endwise thru it. The tube can be remounted by a reversal of the described operations. It may be remarked that since the larger end of the tube is at the head 1 the taper of the tube facilitates the described operations.

The float 22 can be removed without disturbing any of the parts of the structure except the screw plug 20 and support 21, when those parts have been removed the float falls out of the tube thru the opening in the head 2.

The construction and mode of operation of the modification shown in Figs. 4 and 5 are as above described except as follows: The space 9ª in the head 1ª is permanently closed by the pipe fitting 28 and the tube 10ᵃ is mounted and dismounted sidewise. For this purpose the space 9ᵃ accommodates the end of the tube and affords it endwise motion. When the tube is mounted or dismounted the glands 29 are of course backed off. The glands 29 are threaded into the heads. The pin 30 is detachable in respect to the head 1ᵃ and it is removed when the tube 10 is to be mounted or dismounted. When in place the pin 30 serves to limit the upward movement of the float 22. To remove the float 22 without disturbing any of the tube packings the fitting 31 together with the spider 32 and float support 33 are removed or detached and then when the pipe 34 is disconnected the float 22 drops thru the head 2ᵃ.

It will be obvious to those skilled in the art to which the invention relates that modifications may be made in details of construction and arrangement without departing from the spirit of the invention which is not limited in respect to such matters or otherwise than as the prior art and the appended claims may require.

We claim:

1. In a rotameter the combination of not less than two solid columns and two heads integral with the ends of the columns, said heads provided with glands and packings and with spaces beyond the inside of the packings and glands, a tapering transparent tube parallel with the columns and removably mounted in said glands and packings and provided with a float, the wall of one of said spaces provided with a removable threaded element having a float support that enters the tube when assembled and stops short of the gland, thereby permitting removal of the tube.

2. In a rotameter the combination of not less than two solid columns and two heads integral with the ends of the columns, said heads provided with glands and packings and with spaces beyond the inside of the packings and glands, more than one pipe connection integral with the heads and communicating with said spaces, a tapering transparent tube parallel with the columns and removably mounted in said glands and packings and provided with a float, the wall of one of said spaces provided with a removable threaded element having a float support that enters the tube when assembled and stops short of the gland, thereby permitting removal of the tube.

ADELBERT K. FISCHER.
GUSTAV B. PETSCHE.